United States Patent
Li et al.

(10) Patent No.: US 11,246,014 B2
(45) Date of Patent: Feb. 8, 2022

(54) SYSTEM AND METHOD FOR PROVIDING INFORMATION ON TERMINAL DEVICES

(71) Applicant: BEIJING DIDI INFINITY TECHNOLOGY AND DEVELOPMENT CO., LTD., Beijing (CN)

(72) Inventors: Yue Li, Beijing (CN); Tihui Zhang, Beijing (CN)

(73) Assignee: Beijing DiDi Infinity Technology and Development Co., Ltd., Beijing (CN)

(*) Notice: Subject to any disclaimer, the term of this patent is extended or adjusted under 35 U.S.C. 154(b) by 0 days.

(21) Appl. No.: 16/511,121

(22) Filed: Jul. 15, 2019

(65) Prior Publication Data
US 2019/0373423 A1    Dec. 5, 2019

Related U.S. Application Data

(63) Continuation of application No. PCT/CN2017/111699, filed on Nov. 17, 2017.

(30) Foreign Application Priority Data

Feb. 15, 2017  (CN) .......................... 201710082274.3
May 25, 2017  (CN) .......................... 201710378481.3

(51) Int. Cl.
*H04W 64/00* (2009.01)
*H04W 4/20* (2018.01)
(Continued)

(52) U.S. Cl.
CPC .......... *H04W 4/20* (2013.01); *G01C 21/3492* (2013.01); *G01C 21/3691* (2013.01); *H04W 4/40* (2018.02); *H04W 4/50* (2018.02)

(58) Field of Classification Search
CPC .............. G01C 21/3438; G01C 21/343; G01C 21/3484; G01C 21/362; G08G 1/202;
(Continued)

(56) References Cited

U.S. PATENT DOCUMENTS 8,352,175 B2   1/2013  Bauchot et al.
10,453,011 B1  10/2019 Briggs et al.
(Continued)

FOREIGN PATENT DOCUMENTS

CN    101291217 A    10/2008
CN    102543084 A     7/2012
(Continued)

OTHER PUBLICATIONS

Zhu Guowei, Didi Taxi: Is There Really Such a God?, Marketing Cases, 2014, 17 pages.
(Continued)

*Primary Examiner* — Quan M Hua
(74) *Attorney, Agent, or Firm* — Sheppard Mullin Richter & Hampton LLP (57) ABSTRACT

Systems and methods for providing information are disclosed. An exemplary method may comprise determining a current service stage of a service, obtaining status information matching the current service stage, and providing the obtained status information on a locked screen of the terminal device.

11 Claims, 7 Drawing Sheets

(51) Int. Cl.
*H04W 4/50* (2018.01)
*H04W 4/40* (2018.01)
*G01C 21/34* (2006.01)
*G01C 21/36* (2006.01)

(58) Field of Classification Search
CPC .......... G08G 1/005; G08G 1/123; G08G 1/20;
H04W 4/40; H04W 4/023; H04W 4/025;
H04W 4/027; H04W 4/30; H04W 8/20;
G06F 16/60; G06F 16/635; G06F 16/639;
G06F 16/9537; G06F 3/00; G06F 3/165
See application file for complete search history.

(56) References Cited

U.S. PATENT DOCUMENTS

| | | | |
|---|---|---|---|
| 2011/0053552 | A1* | 3/2011 | Kim ................ G08G 1/005 455/404.2 |
| 2011/0099040 | A1* | 4/2011 | Felt ................ H04W 4/025 705/7.12 |
| 2013/0225118 | A1 | 8/2013 | Jang et al. |
| 2013/0246301 | A1* | 9/2013 | Radhakrishnan .. G06Q 30/0282 705/347 |
| 2013/0345980 | A1 | 12/2013 | Van Os et al. |
| 2014/0337949 | A1 | 11/2014 | Hoyos |
| 2014/0358409 | A1 | 12/2014 | Khoe et al. |
| 2015/0011185 | A1 | 1/2015 | Foy et al. |
| 2015/0149288 | A1 | 5/2015 | Saretto et al. |
| 2015/0339923 | A1 | 11/2015 | Konig et al. |
| 2016/0227107 | A1 | 8/2016 | Beaumont |
| 2016/0275638 | A1* | 9/2016 | Korpi ................ G06Q 50/30 |
| 2016/0328471 | A1 | 11/2016 | Goldin et al. |
| 2017/0052034 | A1* | 2/2017 | Magazinik ........ G01C 21/3438 |
| 2017/0249847 | A1* | 8/2017 | Marueli ............. G01C 21/343 |
| 2017/0285642 | A1 | 10/2017 | Rander |
| 2018/0156923 | A1 | 6/2018 | Berclaz et al. |
| 2018/0340466 | A1 | 11/2018 | Li et al. |
| 2019/0095849 | A1 | 3/2019 | Sweeney et al. |

FOREIGN PATENT DOCUMENTS

| | | |
|---|---|---|
| CN | 102622877 A | 8/2012 |
| CN | 103164954 A | 6/2013 |
| CN | 103428698 A | 12/2013 |
| CN | 103489306 A | 1/2014 |
| CN | 103546866 A | 1/2014 |
| CN | 103632534 A | 3/2014 |
| CN | 103944889 A | 7/2014 |
| CN | 104374399 A | 2/2015 |
| CN | 104615350 A | 5/2015 |
| CN | 105333880 A | 2/2016 |
| CN | 105453524 A | 3/2016 |
| CN | 105575161 A | 5/2016 |
| CN | 105893450 A | 8/2016 |
| CN | 303774612 S | 8/2016 |
| CN | 105975224 A | 9/2016 |
| CN | 106250827 A | 12/2016 |
| CN | 106355921 A | 1/2017 |
| CN | 106373076 A | 2/2017 |
| CN | 106469514 A | 3/2017 |
| CN | 106530792 A | 3/2017 |
| JP | 2014-29580 A | 2/2014 |
| JP | 2015-156231 A | 8/2015 |
| JP | 2016-509287 A | 3/2016 |
| SE | 1451114 A1 | 3/2016 |
| WO | 2016/202207 A1 | 12/2016 |

OTHER PUBLICATIONS

The Second Office Action in Chinese Application No. 201710082274.3 dated Apr. 29, 2020, 28 pages.
First Office Action in Chinese Patent Application No. 201710082274.3 dated Nov. 21, 2019, 21 pages.
The Extended European Search Report in European Application No. 17896916.8 dated Dec. 18, 2019, 8 pages.
International Search Report in PCT/CN2017/111699 dated Feb. 22, 2018, 5 pages.
Written Opinion in PCT/CN2017/111699 dated Feb. 22, 2018, 4 pages.
First Office Action in Chinese Application No. 201710378481.3 dated Sep. 23, 2919, 20 pages.
International Search Report in PCT/CN2017/104061 dated Jan. 4, 2018, 4 pages.
Written Opinion in PCT/CN2017/104061 dated Jan. 4, 2018, 4 pages.
Examination Report No. 1 dated Jul. 30, 2020, issued in related Australian Application No. 2017399473 (9 pages).
Examination Report No. 2 dated Feb. 22, 2021, issued in related Australian Application No. 2017399566 (5 pages).
Third Office Action dated Jul. 8, 2020, issued in related Chinese Application No. 201710082274.3, with English machine translation (28 pages).
First Search dated Dec. 8, 2020, issued in related Chinese Application No. 201780025198.0 (2 pages).
First Office Action dated Dec. 15, 2020, issued in related Chinese Application No. 201780025198.0, with English machine translation (21 pages).
First Search dated Jun. 10, 2020, issued in related Chinese Application No. 201780086614.8 (3 pages).
First Office Action dated Jun. 16, 2020, issued in related Chinese Application No. 201780086614.8, with English machine translation (20 pages).
Second Office Action dated Jan. 19, 2021, issued in related Chinese Application No. 201780086614.8, with English machine translation (23 pages).
Examination Report No. 1 dated Apr. 21, 2020, issued in related Australian Application No. 2017399566 (4 pages).
First Search dated Mar. 31, 2020, issued in related Chinese Application No. 201710104502.2 (1 page).
First Office Action dated Apr. 10, 2020, issued in related Chinese Application No. 201710104502.2, with English machine translation (12 pages).
Second Office Action dated Sep. 14, 2020, issued in related Chinese Application No. 201710104502.2, with English machine translation (14 pages).
First Search dated Dec. 6, 2019, issued in related Chinese Application No. 201710157234.0 (2 pages).
First Office Action dated Dec. 16, 2019, issued in related Chinese Application No. 201710157234.0, with English machine translation (11 pages).
Second Office Action dated Jun. 15, 2020, issued in related Chinese Application No. 201710157234.0, with English machine translation (7 pages).
Third Office Action dated Sep. 10, 2020, issued in related Chinese Application No. 201710157234.0, with English machine translation (16 pages).
Second Office Action dated May 9, 2020, issued in related Chinese Application No. 201710378481.3, with English machine translation (18 pages).
Supplemental Search dated Sep. 1, 2020, issued in related Chinese Application No. 201710378481.3 (1 page).
Third Office Action dated Nov. 4, 2020, issued in related Chinese Application No. 201710378481.3, with English machine translation (17 pages).
Extended European Search Report dated Jan. 16, 2020, issued in related European Application No. 17897010.9 (8 pages).
PCT International Preliminary Report on Patentability dated Aug. 29, 2019, issued in related International Application No. PCT/CN2017/104061 (5 pages).
PCT International Preliminary Report on Patentability dated Aug. 29, 2019, issued in related International Application No. PCT/CN2017/111699 (6 pages).
Notice of Reasons for Refusal dated Dec. 1, 2020, issued in related Japanese Application No. 2019-564573, with English machine translation (7 pages).

(56) References Cited

OTHER PUBLICATIONS

Notice of Acceptance dated Mar. 1, 2021, issued in related Australian Application No. 2017399473 (3 pages).
Examination Report No. 3 dated Apr. 23, 2021, issued in related Australian Application No. 2017399566 (4 pages).
Second Office Action dated Jul. 5, 2021, issued in related Chinese Application No. 201780025198.0, with English machine translation (23 pages).
Decision of Refusal dated Apr. 13, 2021, issued in related Japanese Application No. 2019-564573, with English machine translation (5 pages).
Non-Final Office Action dated Jun. 25, 2021, issued in related U.S. Appl. No. 16/541,197 (15 pages).
Notice of Allowance dated Sep. 22, 2021, issued in related U.S. Appl. No. 16/541,197 (10 pages).

* cited by examiner

SYSTEM AND METHOD FOR PROVIDING INFORMATION ON TERMINAL DEVICES

CROSS REFERENCE TO RELATED APPLICATIONS

The present application is a continuation of International Application No. PCT/CN2017/111699 filed on Nov. 17, 2017, designating the United States of America, which is based on and claims priority to the Chinese Patent Application No. 201710082274.3, filed Feb. 15, 2017 and the Chinese Patent Application No. 201710378481.3, filed May 25, 2017. The entire contents of all of the above-referenced applications are incorporated herein by reference.

FIELD OF THE INVENTION

This disclosure generally relates to methods and devices for providing information on terminal devices.

BACKGROUND

With the advance of Internet technology, many Internet-based services have been developed, such as O2O (Online To Offline) services, online tracking services, etc. In various implementations, the user may request through an application installed on a terminal device (e.g., a mobile phone) for a service. After confirming the service, the user may view and monitor tracking information associated with the service through the application. Alternatively, the user may track a service (e.g., public service) online which does not require ordering. However, when the terminal equipment turns dark screen and become screen-locked, the user has to awaken and unlock the terminal device and open the application before she can even start looking for the desired tracking information. These hassles can cause inconvenience, undermine the user experience, delay information, and lower information exchange efficiency.

SUMMARY

Various embodiments of the present disclosure can include systems, methods, and non-transitory computer readable media configured to provide information. According to one aspect, a method for providing information may comprise determining a current service stage of a service, obtaining status information matching the current service stage, and providing the obtained status information on a locked screen of the terminal device. In some embodiments, the service is requested by the terminal device, and the service comprises a vehicle service requested via the Internet.

In some embodiments, determining the current service stage of the service requested by the terminal device comprises in response to determining that a passenger has not been picked up by a transportation service vehicle, obtaining a distance between the vehicle and a target location as a target distance, and determining the current service stage based on the target distance. The target location may comprise a pick-up location for the vehicle to pick up the passenger, or a current location of the passenger.

In some embodiments, determining the current service stage based on the target distance comprises determining a first transportation service stage as the current service stage, in response to determining that the target distance exceeds or is the same as a preset threshold; determining a second transportation service stage as the current service stage, in response to determining that the target distance is below the preset threshold; and determining a third transportation service stage as the current service stage, in response to determining that a transportation trip has commenced according to the request.

In some embodiments, the obtained status information corresponding to the first transportation service stage comprises location information of the vehicle. Providing the obtained status information on the locked screen of the terminal device may comprise, at the first transportation service stage, displaying the location information of the vehicle.

In some embodiments, the obtained status information corresponding to the second transportation service stage comprises vehicle information of the vehicle. Providing the obtained status information on the locked screen of the terminal device may comprise, at the second transportation service stage, displaying the vehicle information of the vehicle.

In some embodiments, the obtained status information corresponding to the third transportation service stage comprises at least one of: current location information of the vehicle; an estimated time to arrive at a destination of the transportation trip; or traffic along a route to the destination.

According to another aspect, a method for providing information may comprise: obtaining position information of a movable object relative to a location; generating a locked-screen interface when the terminal device is screen-locked, the locked-screen interface comprising the obtained position information; and providing the locked-screen interface on the screen-locked terminal device.

In some embodiments, the movable object comprises a vehicle, and the location comprises a pick-up location. The vehicle may comprise a bus. The pick-up location may comprise a bus station. The position information may comprise at least one of: a name of the bus station, a direction of a bus line passing the bus station, a name of the bus line, an estimated time for the bus to arrive at the bus station, or a distance between the bus and the bus station.

In some embodiments, obtaining the position information of the movable object relative to the location comprises obtaining the position information of the movable object relative to the location with real time update. The method may further comprise obtaining a distance between the terminal device and the location, and ceasing obtaining the position information, in response to the distance exceeding a preset threshold.

In some embodiments, obtaining the position information of the movable object relative to the location comprises determining a current service stage of a service, and obtaining status information matching the current service stage.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Terminal devices such as mobile phones often turn dark screen after prolonged idling to preserve power and become screen-locked to shield from unintended operations or to protect privacy. For example, during the device's idle time, the user may accidentally touch the locked screen (e.g., a touch screen), but with no intention to resume the use of the terminal device. The locked-screen which is only unlocked upon receiving a preset input can prevent implementing such unintended operation. For another example, during the device's idle time, a second user may take over the terminal device in a screen-locked state, the screen cannot be unlocked thus preventing privacy theft unless the second user is authenticated. However, the screen-locking mechanism also presents hassles, for example, when the same user using the terminal device has to check for some constantly-updated information. Each time, the user would have to wake up the device, unlock the device, and open a program or application to look for the information or update.

To at least mitigate such problems, systems and methods for providing information on terminal devices are disclosed. In one example, a user requesting vehicle service can conveniently view the vehicle location and vehicle information from a locked-screen. In another example, a person waiting for transportation (e.g., bus) can easily monitor the approach of the next bus and an estimated time of arrival. The methods can be implemented on terminal devices such as mobile phones.

Figure 1:
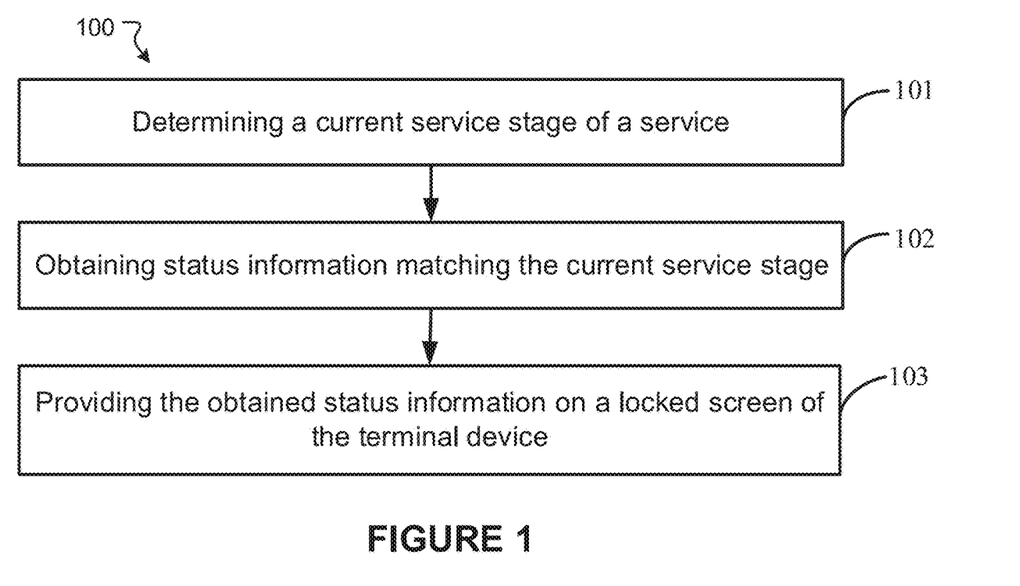
FIG. 1 illustrates a method for providing information, in accordance with various embodiments.

FIG. 1 is a flowchart illustrating a method 100 for providing information on terminal devices, in accordance with various embodiments. The method 100 may be implementable by a terminal device (e.g., mobile phone, computer, pad, tablet, wearable device, personal digital assistant, smart device, media player) or a server and may comprise the following steps.

Step 101 may comprise determining a current service stage of a service (e.g., an Internet-based service). The request may or may not have been requested by the terminal device. In some embodiments, the requested service may comprise an O2O service. For example, the service may be a vehicle service requested through the Internet (e.g., express vehicle service, limousine service, ride-sharing service, vehicle hailing service, delivery service). The service may comprise transporting people and/or items (e.g., takeout food, grocery orders). For another example, the service may be a public service (e.g., bus, subway, train, ferry), which does not require ordering.

In some embodiments, the requested service may comprise a series of service stages. In one example of vehicle service, a passenger may use a terminal device to submit a transportation request, which can be received and accepted by a vehicle driver via the driver's terminal device. After establishing the service relationship between driver and passenger services, various service stages can be determined. For example, a first transportation service stage can be when the passenger has not been picked up and is far away (e.g., further than a threshold distance) from the driver (or vehicle), a second transportation service stage can be when the passenger has not been picked up and is close to (e.g., within a threshold distance) the driver (or vehicle), and a third transportation stage can be after the passenger is picked up by the driver and before completion of the service (arriving at a destination of the transportation service).

In another example of takeout delivery service, a customer may use a terminal device to request delivery, which can be received and accepted by a delivery carrier via the carrier's terminal device. After establishing the service relationship between the customer and the carrier, various service stages can be determined. For example, a first delivery service stage can be when the carrier proceeds to the takeout shop to fetch the takeout, a second delivery service stage can be when the carrier obtains the takeout from the takeout shop, and a third delivery service stage can be when the carrier dispatches from the takeout shop for delivery.

Step 102 may comprise obtaining status information matching the current service stage.

In some embodiments, the status information matching the current service stage may comprise status information associated with the current service stage. For example, during the first transportation service stage, the status information may include the current location information of the driver's vehicle, the basic information of the vehicle, the distance between the driver and the pick-up location, the estimated time for the driver to arrive at the pick-up location, etc. For another example, during the second transportation service stage, the status information may include the detailed information of the vehicle, the current location information of the driver's vehicle, etc. For another example, during the third transportation service stage, the status information may include the trip progress information, the estimated time to arrive at the destination, the traffic condition along the transportation trip route, etc.

In yet another example, during the first delivery service stage, the status information may include the current location information of the delivery carrier, the traffic condition along the route to the takeout shop, the estimated time to arrive at the takeout shop, etc. For another example, during the second delivery service stage, the status information may include the takeout order details, etc. For another example, during the third delivery service stage, the status information may include the current location information of the delivery carrier, the traffic condition along the delivery trip route, and the estimated time to arrive at the delivery destination, etc.

In some embodiments, the status information can be obtained by the terminal device based on the current service stage. For example, status information obtaining methods corresponding to the current service stage can be determined by the terminal device. For another example, the terminal device can transmit a status information request including the current service stage to a server, causing the server to send over the status information. Alternatively, various other methods can be used to obtain the status information.

Step 103 may comprise, providing the obtained status information on a locked screen of the terminal device. The step 103 may be performed when the terminal device is in a screen-locked state and is awakened from a dark-screen mode. For example, upon detecting certain user operations (e.g., upon detection of a touch operation on a designated button), which indicate that the user is operating or is about to operate the terminal device, the terminal device may resume power to its screen, despite that the screen is still locked.

In some embodiments, the terminal device's display screen can be bright or dark depending on the power supply to its backlights or the equivalent. To conserve power, the terminal device may turn into a dark screen mode by dimming or turning off the display or the equivalent according to the display technology deployed. For example, the dark screen may be triggered when the device has been idle for a preset time (e.g., 2 minutes) or when a preset command is received (e.g., two designated buttons are pressed). Further, the display screen can be locked or unlocked. The screen lock can regulate immediate access to the device by requiring that the user perform a certain action in order to receive access, such as entering a password, using a certain button combination, or performing a certain gesture using the device's touchscreen. The screen can be locked in both the dark screen mode and an active mode. Turning into the dark screen mode may automatically lock the screen. In one example, after some idle time, a mobile phone previously used by a user may automatically darken and lock its screen. When the user resumes operation by pressing phone's designated button or an equivalent, the mobile phone's screen may brighten upon sensing the press, but remain in a locked-screen state, providing limited access. Only after a successful unlock operation (e.g., inputting a preset unlocking swipe, inputting a correct password or a stored fingerprint, etc.) at the locked screen, the user is able to regain fully access to the mobile phone's functions.

In some embodiments, even if the terminal device's screen is locked, the obtained status information can be provided on the locked screen of the terminal device. For example, when the terminal device's screen is locked and active after user operation was resumed after idling as described above, the status information may be displayed on the locked screen of the terminal device. The corresponding status information which the user is concerned with at the current service stage can be shown to the user on the locked screen. Thus, operations such as unlocking the screen, activating the application, and looking for the status information can be obviated.

Further, the user may care about different kinds of status information at different service stages. The displayed statues information can be determined based on the current service stage. In one example, during the first transportation service stage, the passenger may care more about the current location of the vehicle, which indicates a progress of the service. In another example, during the second transportation service stage, the passenger may care more about the detailed information of the vehicle (e.g., vehicle make, model, color, plate number), which can help the user spot the vehicle when the vehicle approaches. In another example, during the first or third delivery service stage, the customer may care more about the carrier's current location information, which indicates how soon the takeout can arrive.

Based on the disclosed methods for providing information on terminal devices, the current service stage of a service can be determined according a request transmitted from the terminal device, and corresponding status information can be obtained for display at a locked screen of the terminal device. Thus, the user can conveniently view the status information from the locked screen without having to unlock the screen, open the application, and look for such information. The information output efficiency is improved.

Figure 2:
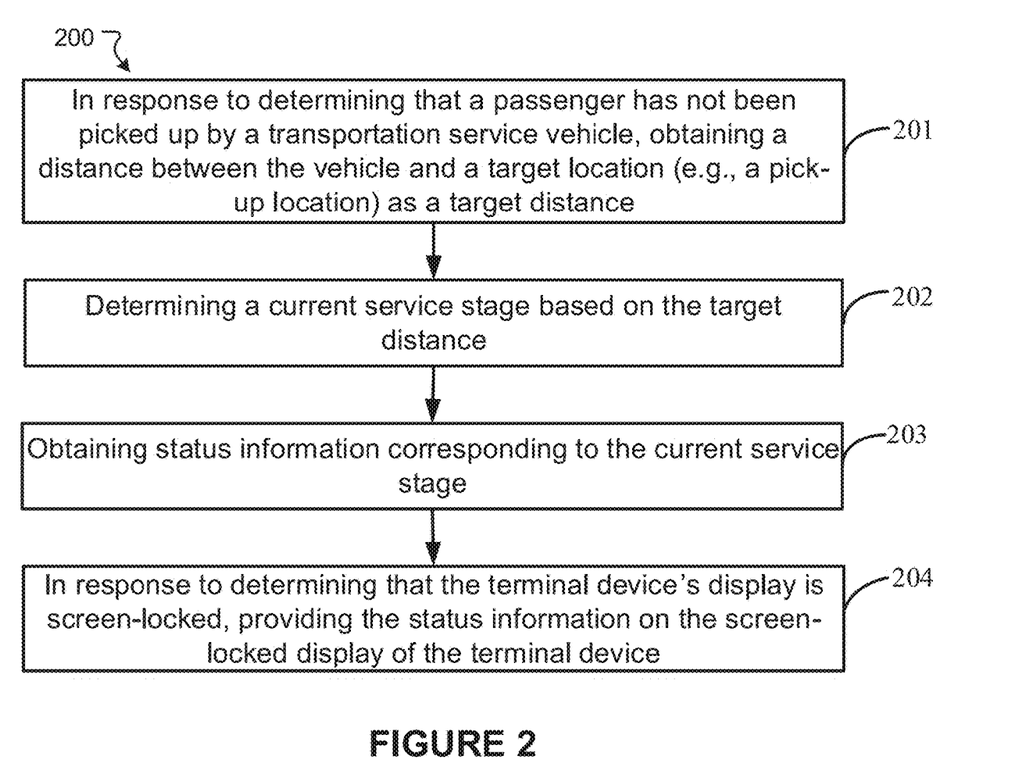
FIG. 2 illustrates a method for providing information, in accordance with various embodiments.

FIG. 2 is a flowchart illustrating a method 200 for providing information on terminal devices, in accordance with various embodiments. The method 200 may describe requesting a current service stage of a service from a terminal device. The method 200 may be implementable by a terminal device (e.g., the passenger's mobile phone) or a server and may include steps 201-204. The step 101 described above may comprise step 201 and step 202.

Step 201 may comprise, in response to determining that a passenger has not been picked up by a transportation service vehicle, obtaining a distance between the vehicle and a target location (e.g., an origin of the transportation trip, a pick-up location, a current location of the passenger) as a target distance.

In various embodiments, a transportation service order may be submitted and accepted (e.g., when a user submits such request through his mobile phone, and the request is subsequently accepted by a vehicle driver via the driver's mobile phone). The service order may include a pick-up location, and the driver accepting the request may proceed to the pick-up location. After the user is picked up, the transportation trip can be marked as started, for example, as the driver confirms a "pick-up accomplished" from the driver's mobile phone. If such confirmation has been detected, the user's mobile device may determine that the transportation trip has started, that is, the passenger has been picked up by the transportation service vehicle. If no such confirmation has been detected, the user's mobile device may determine that the transportation trip has not started, that is, the passenger has not been picked up by the transportation service vehicle. Alternatively, various other methods can be used to determine if the passenger has been picked up by the transportation service vehicle.

In some embodiments, the location may include an origin (starting location of the transportation trip or a (current) pick-up location. Since the driver's device (e.g., mobile phone) may be communicative with a server and report its location (that is, the vehicle's location), the user's device (e.g., mobile phone) may request and obtain the vehicle's location from the server, and further request and obtain the target distance based on the vehicle's location from the server. Alternatively, various other methods can be used to obtain the target distance. For example, the user's terminal device may compute the target distance based on the vehicle's location and the target location.

Step 202 may comprise determining a current service stage based on the target distance.

In some embodiments, if the transportation trip has not started, the target distance may include the distance between the current location of the vehicle and the target destination, and the current service stage can be determined based on the target distance. For example, the target distance can be compared with a preset threshold. If the target distance exceeds or is the same as the preset threshold, the terminal device or the server may determine that the current service stage is the first transportation service stage. If the target distance is below the preset threshold, the terminal device or the server may determine that the current service stage is the second transportation service stage. If the transportation trip has started, the terminal device or the server may determine that the current service stage is the third transportation service stage. The preset threshold may be an automatic setting by the system or configurable by user. The preset threshold may be based on history trips and can be any reasonable distance, which is not limited to specific values.

Step 203 may comprise obtaining status information corresponding to the current service stage.

In some embodiments, since the passenger may be more concerned with the current location information of the vehicle in the first transportation service stage, the status information corresponding to the first transportation service stage may comprise the current location information of the vehicle. The status information corresponding to the first transportation service stage may further comprise the basic information of the vehicle, the distance between the driver and the pick-up location, the estimated time for the driver to arrive at the pick-up location, etc.

In some embodiments, since the passenger may be more concerned with the vehicle information in the second transportation service stage in order to spot the vehicle quickly as it approaches, the status information corresponding to the second transportation service stage may include at least the vehicle information of the vehicle coming for the pick-up. The status information corresponding to the second transportation service stage may further include the detailed information of the vehicle, the current location information of the driver's vehicle, etc.

In some embodiments, the status information corresponding to the third transportation service stage may include the current location information of the vehicle, the estimated time to arrive at the destination, the traffic condition along the transportation trip route (traffic along a route to the destination), etc.

Step 204 may comprise, in response to determining that the terminal device's display is screen-locked, providing the status information on the screen-locked display of the terminal device. Providing the status information on the locked screen can inform the user of the service information associated with the current service stage with great convenience.

In some embodiments, the status information can be provided in various ways. For example, the status information can be shown at the screen center, in a large font size, in highlight, etc. Other display methods known in the art or may arise in the future can be alternatively used here.

Figure 3:
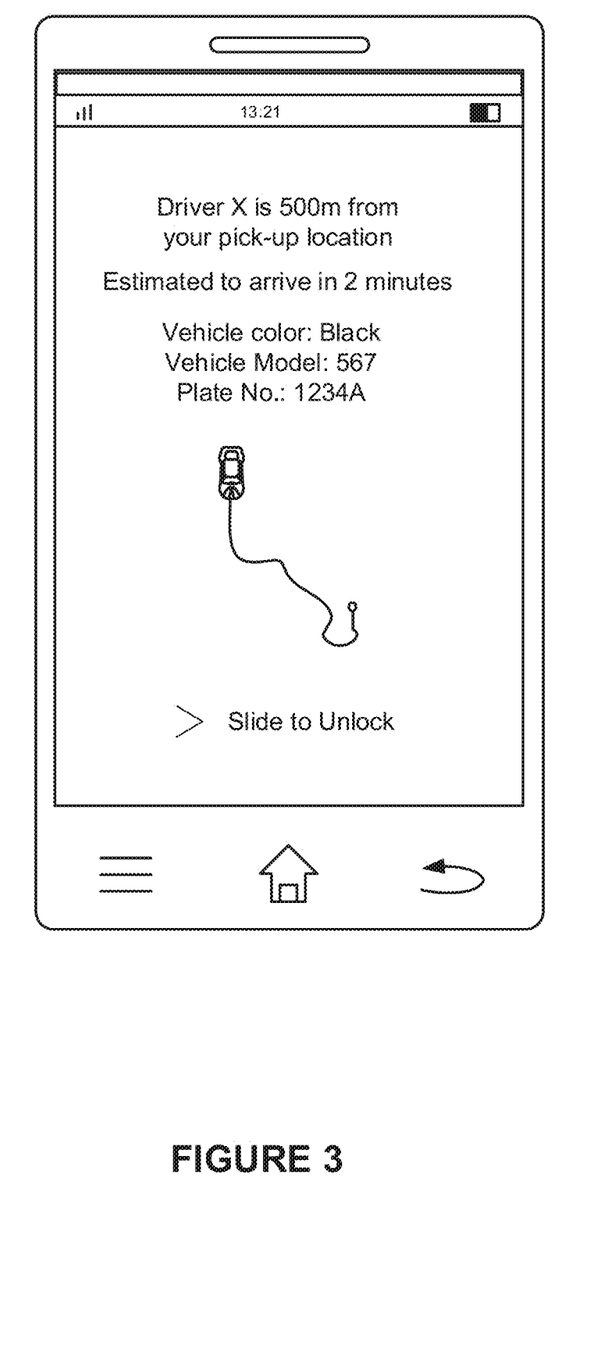
FIG. 3 illustrates example information provided on a terminal device, in accordance with various embodiments.
Figure 4:
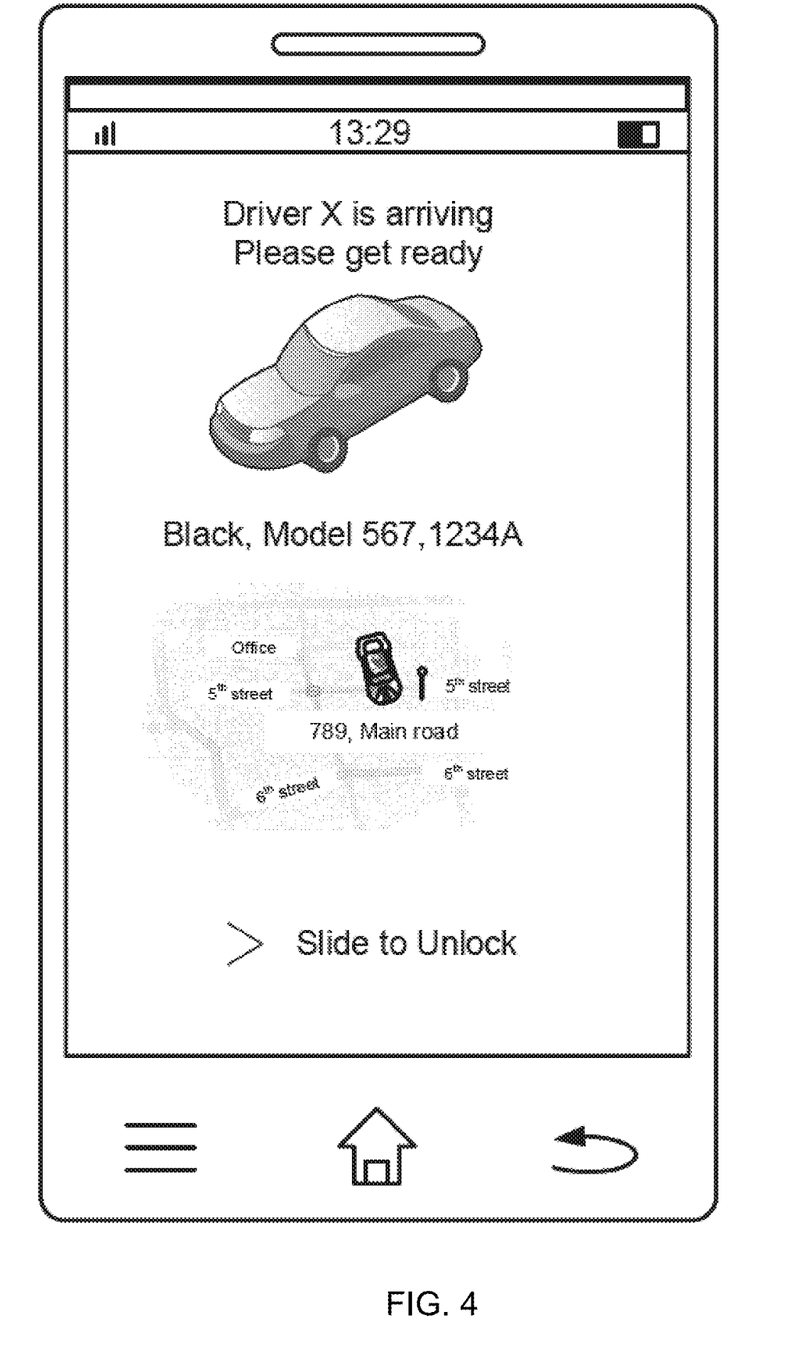
FIG. 4 illustrates example information provided on a terminal device, in accordance with various embodiments.

In various embodiments, the disclosed systems and methods can be applied to vehicle services. A service customer may use a terminal device (e.g., a mobile phone installed with a vehicle service software application) to request the vehicle service. After a driver accepts the request, thereby establishing the service relationship between the customer and the driver and confirming a pick-up location, the driver may drive to the pick-up location. If the customer checks his screen-locked mobile phone while the vehicle is more than 30 m away from the pick-up location, as shown in FIG. 3, the mobile phone can show on the locked screen the current location information of the vehicle, the basic information of the vehicle, the distance between the driver and the pick-up location, and the estimated time for the driver to arrive at the pick-up location, etc. The current location of the vehicle can be highlighted. If the customer checks his screen-locked mobile phone while the vehicle is less than 30 m away from the pick-up location, as shown in FIG. 4, the mobile phone can show on the locked screen the detailed information of the vehicle, the current location information of the vehicle, etc. The current location of the vehicle can be highlighted. If the customer checks his screen-locked mobile phone after being picked-up by the driver, the mobile phone can show on the locked screen the current location information of the vehicle, an estimated time to arrive at the destination, the traffic along the route of the transportation trip, etc.

As such, status information can be shown on terminal devices according to the disclosed information display methods. A terminal device can determine if the vehicle service requested through the user's terminal device has commenced (e.g., it may have commenced when the user is picked up). If the service has not commenced, the terminal device may obtain a distance between the vehicle's current location and the pick-up location as the target distance. The terminal device may further determine a current transportation service stage based on the target distance and obtain the status information corresponding to the current transportation service stage. Upon determining that its screen in locked, the terminal device may display the obtained status information on the locked screen. Thus, the user can conveniently view the status information, and the information output efficiency is improved.

The operations of the disclosed methods shown in various orders in the drawings are merely exemplary. The orders can be modified. Additionally or alternatively, some steps may be omitted, combined, and/or divided.

Figure 5:
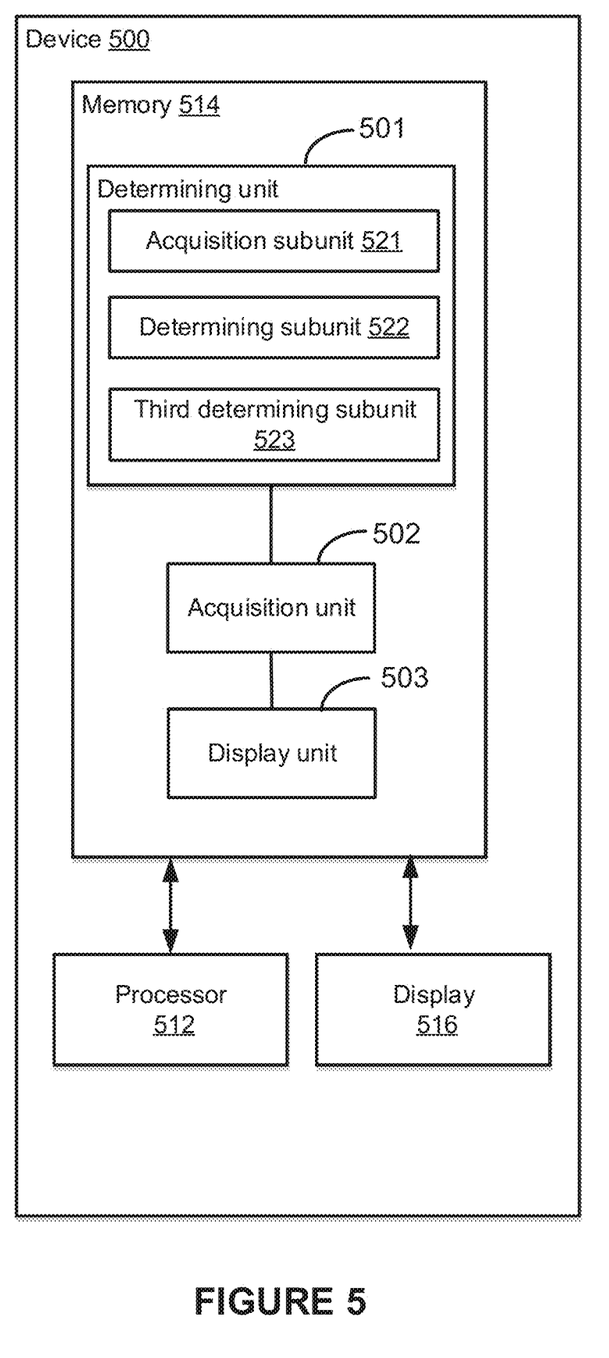
FIG. 5 illustrates a device for providing information, in accordance with various embodiments.

FIG. 5 is a block diagram illustrating a device 500 for providing information on terminal devices, in accordance with various embodiments. The device 500 may be implemented on a terminal device (e.g., a mobile phone). The device 500 may comprise: a processor 512, a memory 514 (e.g., a non-transitory computer-readable storage medium), and a display 516 (e.g., a liquid crystal display with touch sensing) coupled to each other. The device 500 may comprise various other components not shown here (e.g., communication components). The memory 514 may be configured to store instructions that, when executed by the processor 512, cause the processor 512 to perform various steps and methods described herein. In some embodiments, the memory 514 may comprise a determining unit 501, an acquisition unit 502, and a display unit 503. The determining unit 501 may be configured to perform the step 101 described above. The acquisition unit 502 may be configured to perform the step 102 described above. The display unit 502 may be configured to perform the step 103 described above. Accordingly, the status information and other information may be displayed on the display 516. The device 500 may also comprise various sensors (e.g., capacitive sensors embedded in the display 516) to detect whether a user is operating the device 500. If the duration of idling exceeds a preset threshold, the processor 512 may dim or switch off the display 516 and/or screen-lock the display 516.

In some embodiments, the determining unit 501 may comprise an acquisition subunit 521 and a determining subunit 522. The acquisition subunit 521 may be configured to perform the step 201 described above. The determining subunit 522 may be configured to perform the step 202 described above. The acquisition unit 502 may be configured to perform the step 203 described above. The display unit 503 may be configured to perform the step 204 described above (e.g., to display the status information corresponding to the first, second, or third transportation service stage).

In some embodiments, the determining subunit 522 may be configured to compare the target distance with a preset threshold. If the target distance exceeds or is the same as the preset threshold, the determining subunit 522 may determine that the current service stage is the first transportation service stage. If the target distance is below the preset threshold, the determining subunit 522 may determine that the current service stage is the second transportation service stage.

In some embodiments, the determining unit 501 may comprise a third determining subunit 523 configured to determine that the current service stage is the second transportation service stage, in response to determining that the transportation trip has started (e.g., when the passenger is picked-up).

The units and subunits described herein may be implemented as hardware, software (e.g., the instructions stored in the memory 514), or a combination of both. The software can be preloaded in the device, or downloaded to the device. For example, the various units and subunits may be implemented as a part of software codes for an application installed on a mobile phone. These units and subunits may work in conjunction with various other hardware and software units of the device to achieve various functions. One or more of the units and subunits may or may not be physically separable. Some or all of the units and subunits may be integrated in the device or distributed over a network. Various locations described herein may be determined based on a GPS (Global positioning system) or equivalent accessible to the terminal device. For example, the driver's mobile phone accessing the GPS may locate the vehicle, and the user/customer/passenger's mobile phone accessing the GPS may locate the user/customer/passenger.

Figure 6:
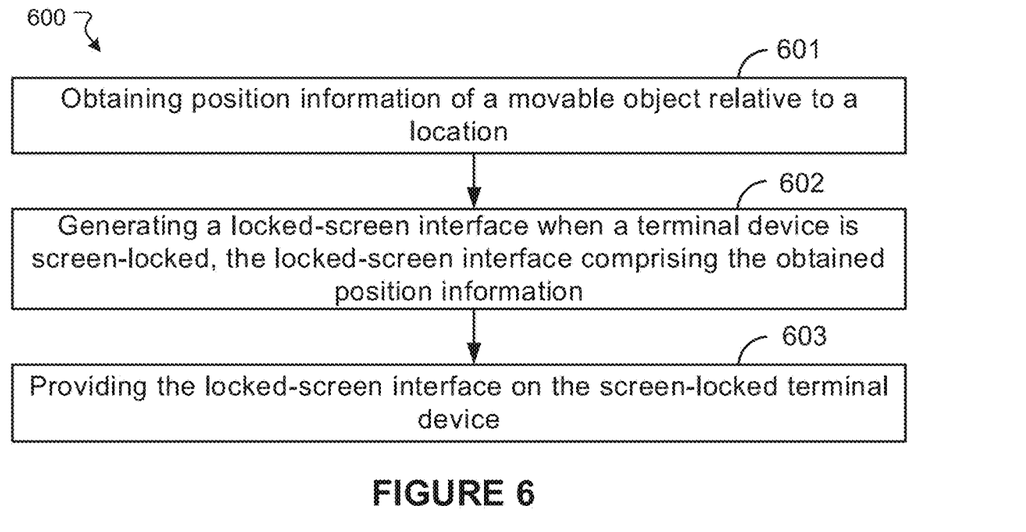
FIG. 6 illustrates a method for providing information, in accordance with various embodiments.

FIG. 6 is a flowchart illustrating a method 600 for providing information on terminal devices, in accordance with various embodiments. The method 600 may be implementable by a terminal device (e.g., mobile phone, computer, pad, tablet, wearable device, personal digital assistant, smart device, media player) or a server and may comprise the following steps.

Step 601 may comprise obtaining position information of a movable object relative to a location. The position information may change over time, and obtained position information may be updated in real time. In one example, the movable object may be a vehicle (e.g., a vehicle requested through the Internet as described above), the location may comprise a pick-up location confirmed by the driver of the vehicle and a customer, and the position information may comprise a distance from the vehicle to the location. In another example, the movable object may be a bus, the location may be a pick-up location (e.g., one or more bus stations for buses to pick up passengers, any vehicle stopping location for service vehicles to pick up passengers), and the position information may comprise a distance from the bus to each of the one or more bus stations. In yet another example, the movable object may be a drone, the location may be a user-configured location, and the position information may comprise a distance from the drone to the location.

In some embodiments, the movable object's position may be determined by a GPS or equivalent. For example, the bus may be equipped with a GPS transmitting its location in real time to a remote server, which distributes or otherwise processes the position information. For another example, the vehicle driver may carry a mobile phone equipped with a GPS. The mobile phone GPS may transmit the location of the mobile phone (same as the location of the vehicle) to a remote server, which distributes or otherwise processes the position information.

In some embodiments, the step 601 may comprise the steps 101 and 102 described above. That is, obtaining the position information of the movable object relative to the location may comprise determining a current service stage of a service and obtaining status information matching the current service stage. Details can be referred to the method 100 described above.

Step 602 may comprise generating a locked-screen interface when a terminal device is screen-locked, the locked-screen interface comprising the obtained position information. In some embodiments, after being screen-locked, the terminal device may generate the locked-screen interface for displaying once the terminal device is awakened but still screen-locked.

Step 603 may comprise providing the locked-screen interface on the screen-locked terminal device. There may be many ways for the terminal device to monitor its screen to determine if the screen is locked (most device functions locked out to the user), unlocked (full access to device functions granted), dark-screen (display turned off), or awakened (display turned on). When the device is awakened, it may be lock or unlocked. In some embodiments, an operating system of the terminal device may broadcast the screen-lock state when the screen is locked. For example, in an Android system, android.intent.action.SCREEN_OFF represents a broadcast to other device components that the screen is locked, and android.intent.action.SCREEN_ON represents another broadcast that the screen is awakened. Thus, screen status can be determined by a software program monitoring such system broadcast.

In some embodiments, if the operating system has authorized display of the locked-screen interface, a software program (e.g., memory instructions) can directly cause the terminal device to display the locked-screen interface. If the operating system has not authorized the display of the locked-screen interface, after the step 602, the method 600 may further comprise sending the locked-screen interface to an operating system of the terminal device, and the step 603 may comprise causing the operating system to provide the locked-screen interface on the terminal device, in response to the terminal device awakened from being screen-locked.

In some embodiments, the position information may vary in time and may be updated in real time. To provide accurate position information, the step 601 may comprise obtaining the position information of the movable object relative to the location periodically at each first preset time period. The method 600 may further comprise updating the locked-screen interface based on the most recently obtained position information periodically at each second preset time period. The first and second preset time periods may be the same or different. The first preset time period can limit data traffic volume and power consumption.

In some embodiments, the movable object is a bus, and a software application can be provided for installation on terminal devices such as mobile phones to allow user access to bus-related information. For example, a customer may be waiting for the bus at a bus station, while carrying a mobile phone installed with such application. The obtained position information in this case may comprise an arrival time for each of one or more incoming buses. The arrival time may be obtained based at least on a distance between the bus and the bus station. The locked-screen interface may display such obtained position information.

In some embodiments, there can be one or more bus lines stopping over the same bus station, and each line may be run by one or more buses each separated by some distance. The user may configure the locked-screen interface to show position information of one or more particular buses, of one or more buses for a previously searched bus line, of one or more buses for a system-recommended bus line, etc. For example, a software system accessible to the terminal device may track time and locations frequented by the user (e.g., workplace in the morning and home at night). The system may recommend a bus line from home to workplace in a weekday morning, and a bus line from workplace to home in a weekday evening. Further, the customer may care most about the next few buses, and the obtained information may correspond to one or more buses closest to the bus station and that will stop at the bus station. Here, the location of the bus station may be configured by the customer via the customer's terminal device, or may be a closest bus station to the customer's location.

Figure 7A:
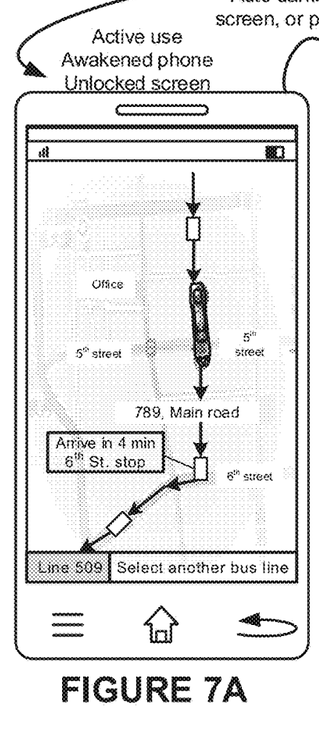
FIG. 7A illustrates an active screen of a terminal device, in accordance with various embodiments.
Figure 7B:
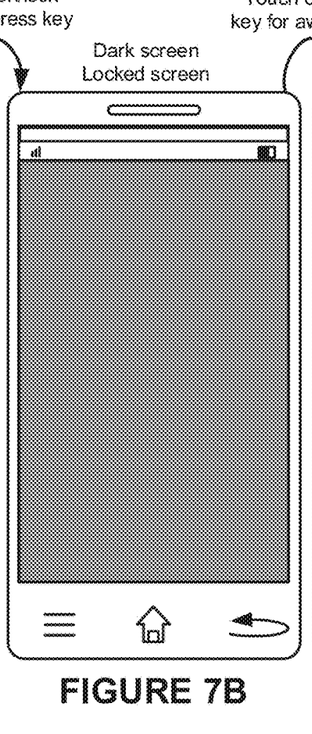
FIG. 7B illustrates a dark screen of a terminal device, in accordance with various embodiments.
Figure 7C:
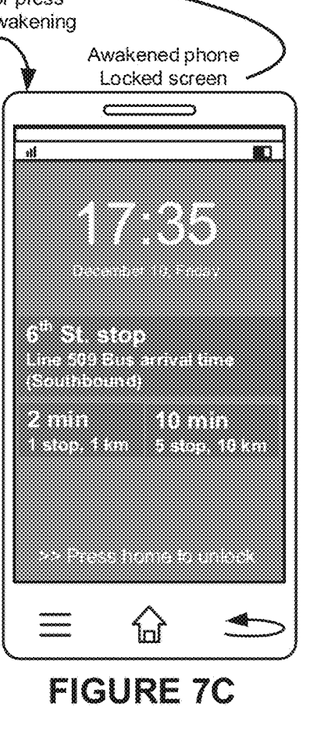
FIG. 7C illustrates a generated locked-screen interface of a terminal device, in accordance with various embodiments.

FIG. 7A-FIG. 7C are diagrams illustrating information-providing terminal devices, in accordance with various embodiments. The terminal devices in these figures are shown as the same mobile phone, providing different information in different conditions on its display. Alternatively, the information can be played as audio by the terminal device. As shown in FIG. 7A, a user waiting for the bus at the $6^{th}$ St. bus station may actively use the mobile phone to open an application and view travel-related information. The mobile phone is awake, and its screen is unlocked. Here, information of the bus line 509 is selected. The displayed information may include a map, overlaid with the bus line and direction, bus station locations, current locations of buses, an estimated arrival time at a bus stations for the next bus, etc. When the user has done using the mobile phone, she may press certain buttons or otherwise put the mobile phone into a dark-screen mode (sometimes also referred to as a sleep mode, an idle mode, etc.) as shown in FIG. 7B, where power to the display screen is reduced or cut off. Alternatively, the mobile phone may self-trigger the dark-screen mode, upon idling for a preset time threshold (e.g., 1 minute). After the mobile phone goes dark screen, the screen may be turned back on if the mobile phone detects user operation (e.g., touch certain areas). Even when the screen is turned back on, the user may still need to provide a preset input (e.g., press home key, input a password) to unlock the screen to gain full access. However, sometimes, the user may just want to re-check some bus information without regaining full access. Accordingly, as shown in FIG. 7C, the user may awaken the mobile phone, but leave the screen locked. On this locked-screen, the above-described locked-screen interface is provided. This example locked-screen interface includes date, time, a name of the bus station, a direction of a bus line passing the bus station, a name of the bus line, an estimated time for the bus to arrive at the bus station, or a distance between the bus and the bus station, etc. Thus, the user is assured that the next bus is coming in 2 minutes. The displayed information is configurable and may include various information. From FIG. 7C, upon receiving an unlocking input, the mobile phone may be unlocked and become active. FIG. 7A may be restored if it was the previous active session before screen was locked.

In some embodiments, the user's need for acquiring information related to a certain event from a locked-screen may conclude with the end of a service. For example, the user would like to check for the bus arrival time until the bus comes and picks the user up. Thus, the method 600 may further include ceasing obtaining the position information in response to a distance between the terminal device and the location exceeding a preset threshold (e.g., 200 m, 400 m, 500 m). For example, when the terminal device (representing the user) and the location (representing the bus station) are far apart, the terminal device can determine that the user has left the location. The user may have boarded a bus or changed plan, since a larger distance is associated with a higher probability that the user has left the station. Thus, when the preset threshold is exceeded, it can be determined that the user has left the location, and no further position information update is necessary. Accordingly, the method 600 can be ceased, and an instruction can be sent to the system operating system that the generated locked-screen interface is no longer in effect and a system interface can be restored upon the awakening of a locked screen.

Figure 8:
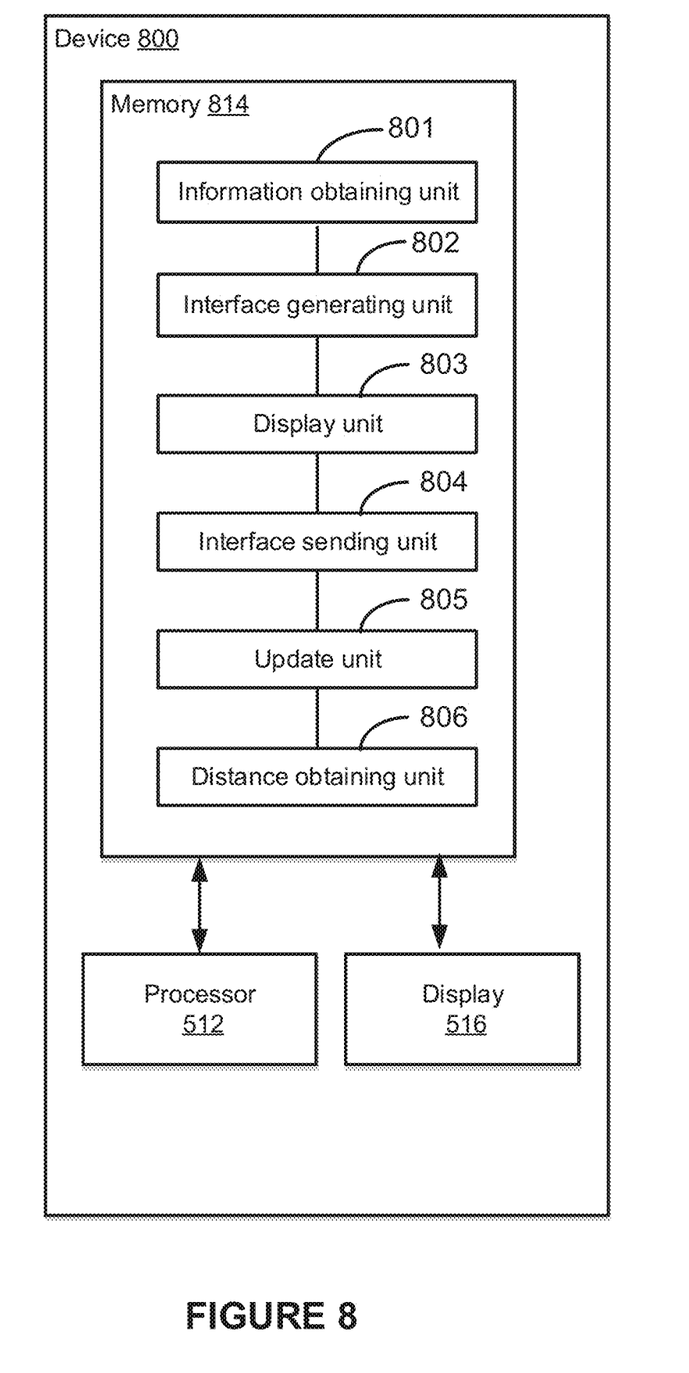
FIG. 8 illustrates a device for providing information, in accordance with various embodiments.

FIG. 8 is a block diagram illustrating a device 800 for providing information on terminal devices, in accordance with various embodiments. The device 800 may be implemented on a terminal device (e.g., a mobile phone). The device 800 is similar to the device 500 described above and also comprises the processor 512, a memory 814 (e.g., a non-transitory computer-readable storage medium), and the display 516 (e.g., a liquid crystal display with touch sensing) coupled to each other. The interactions and functions among various components of the device 800 is similar to those of the device 500, except that the memory 814 may differ from the memory 514 in terms of its units. Nevertheless, the memory 814 and the memory 514 can be merged into a single memory with the combined units (e.g., software instructions). The various units of the memory 814 can be similarly implemented as a part of software codes of an application installed on a mobile phone.

In some embodiments, the memory 814 may comprise an information obtaining unit 801, an interface generating unit 802, and a display unit 803. The information obtaining unit 801 may be configured to perform the step 601 described above, the interface generating unit 802 may be configured to perform the step 602 described above, and the display unit 803 may be configured to perform the step 603 described above. The interface generating unit 802 and/or other instructions stored in the memory 814 may monitor the screen status: dark, bright, locked, unlocked, etc.

In some embodiments, the memory 814 may further comprise an interface sending unit 804 configured to send the locked-screen interface to an operating system of the terminal device, and the display unit may be further configured to cause the operating system to provide the locked-screen interface on the terminal device, in response to the terminal device awakened from being screen-locked.

In some embodiments, the information obtaining unit 801 may be further configured to obtaining the position information of the movable object relative to the location periodically at a first preset time period, and the memory 814 may further comprise an update unit 805 configured to update the locked-screen interface based on the most recent obtained position information periodically at a second preset time period.

In some embodiments, the memory 814 may further comprise distance obtaining unit 806 configured to obtain a distance between the terminal device and the location and cease the obtaining of the position information in response to the distance exceeding a preset threshold (e.g., 200 m, 400 m, 500 m). Further, the display unit 803 may be configured to display a system interface upon the awakening of a locked screen.

The units described herein may be implemented as hardware, software (e.g., the instructions stored in the memory 814), or a combination of both. The software can be preloaded in the device, or downloaded to the device. For example, the various units may be implemented as a part of software codes for an application installed on a mobile phone. These units may work in conjunction with various other hardware and software units of the device to achieve various functions. One or more of the units may or may not be physically separable. Some or all of the units may be integrated in the device or distributed over a network. Various locations described herein may be determined based on a GPS (Global positioning system) or equivalent accessible to the terminal device. For example, the driver's mobile phone accessing the GPS may locate the vehicle, and the user/customer/passenger's mobile phone accessing the GPS may locate the user/customer/passenger.

Figure 9:
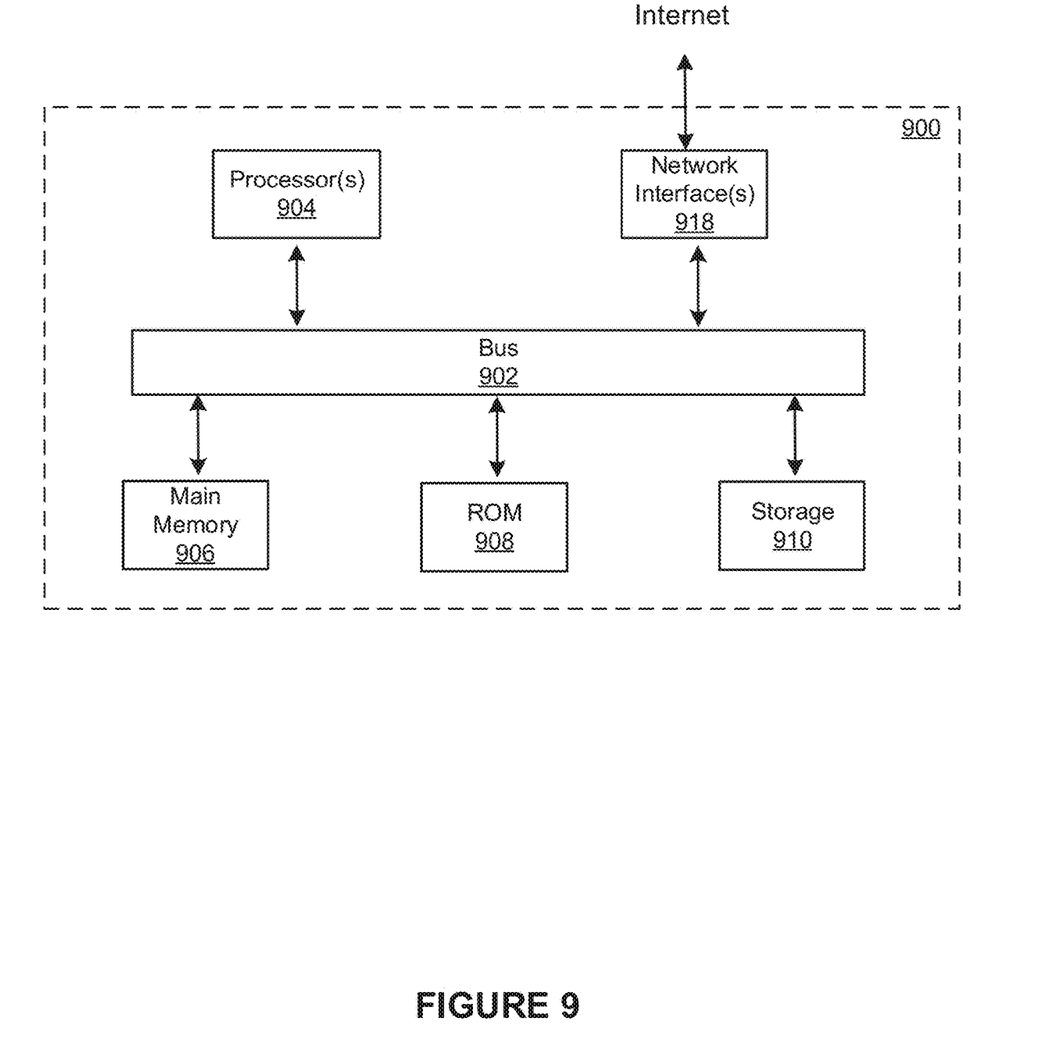
FIG. 9 illustrates a block diagram of an example computer system in which any of the embodiments described herein may be implemented.

FIG. 9 is a block diagram that illustrates a computer system 900 upon which any of the embodiments described herein may be implemented. The system 900 may correspond to the device 500 or 800 described above. The computer system 900 includes a bus 902 or other communication mechanism for communicating information, one or more hardware processors 904 coupled with bus 902 for processing information. Hardware processor(s) 904 may be, for example, one or more general purpose microprocessors. The processor(s) 904 may correspond to the processor 512 described above.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions. The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions. The main memory 906, the ROM 908, and/or the storage 910 may correspond to the memory 514 or 814 described above. The various units and subunits may be implemented as instructions stored in the memory.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The main memory 906, the ROM 908, and/or the storage 910 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 900 also includes a network interface 918 coupled to bus 902. Network interface 918 provides a two-way data communication coupling to one or more network links that are connected to one or more local networks. For example, network interface 918 may be an integrated services digital network (ISDN) card, cable modem, satellite modem, or a modem to provide a data communication connection to a corresponding type of telephone line. As another example, network interface 918 may be a local area network (LAN) card to provide a data communication connection to a compatible LAN (or WAN component to communicated with a WAN). Wireless links may also be implemented. In any such implementation, network interface 918 sends and receives electrical, electromagnetic or optical signals that carry digital data streams representing various types of information.

The computer system 900 can send messages and receive data, including program code, through the network(s), network link and network interface 918. In the Internet example, a server might transmit a requested code for an application program through the Internet, the ISP, the local network and the network interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various operations of example methods described herein may be performed, at least partially, by an algorithm.

The algorithm may be comprised in program codes or instructions stored in a memory (e.g., a non-transitory computer-readable storage medium described above). Such algorithm may comprise a machine learning algorithm or model. In some embodiments, a machine learning algorithm or model may not explicitly program computers to perform a function, but can learn from training data to make a predictions model (a trained machine learning model) that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The invention claimed is:

1. A method for providing information, the method comprising:
   determining a current service stage of a service requested by a terminal device, wherein determining the current service stage comprises:
   in response to determining that a passenger has not been picked up by a transportation service vehicle, obtaining a distance between the transportation service vehicle and a target location as a target distance;
   determining a first transportation service stage as the current service stage, in response to determining that the target distance exceeds or equals to a preset threshold;

determining a second transportation service stage as the current service stage, in response to determining that the target distance is below the preset threshold; and
determining a third transportation service stage as the current service stage, in response to determining that the passenger has been picked up and a transportation trip of the service has commenced;
based on the current service stage, obtaining status information matching the current service stage for displaying on a locked screen of the terminal device, wherein:
different pieces of status information match with different service stages for displaying,
the status information corresponding to the first transportation service stage comprises the target distance between the transportation service vehicle and the target location,
the status information corresponding to the second transportation service stage comprises vehicle information of the transportation service vehicle, and
the status information corresponding to the third transportation service stage comprises an estimated time to arrive at a destination of the transportation trip, and a traffic condition on a route to the destination of the transportation trip; and
upon determining that the screen of the terminal device is locked,
providing the status information matching the current service stage on the locked screen of the terminal device.

2. The method of claim 1, wherein:
the service comprises a vehicle service requested via Internet.

3. The method of claim 1, wherein the target location comprises:
a pick-up location for the transportation service vehicle to pick up the passenger; or
a current location of the passenger.

4. The method of claim 1, wherein providing the obtained status information on the locked screen of the terminal device comprises:
at the first transportation service stage, displaying the target distance between the transportation service vehicle and the target location.

5. The method of claim 1, wherein providing the obtained status information on the locked screen of the terminal device comprises:
at the second transportation service stage, displaying the vehicle information of the transportation service vehicle.

6. A system for providing information, the system comprising a processor and a memory storing instructions that, when executed by the processor, cause the processor to perform operations comprising:
determining a current service stage of a service requested by a terminal device, wherein determining the current service stage comprises:
in response to determining that a passenger has not been picked up by a transportation service vehicle, obtaining a distance between the transportation service vehicle and a target location as a target distance;
determining a first transportation service stage as the current service stage, in response to determining that the target distance exceeds or equals to a preset threshold;
determining a second transportation service stage as the current service stage, in response to determining that the target distance is below the preset threshold; and
determining a third transportation service stage as the current service stage, in response to determining that the passenger has been picked up and a transportation trip of the service has commenced;
based on the current service stage, obtaining status information matching the current service stage for displaying on a locked screen of the terminal device, wherein:
different pieces of status information match with different service stages for displaying,
the status information corresponding to the first transportation service stage comprises the target distance between the transportation service vehicle and the target location,
the status information corresponding to the second transportation service stage comprises vehicle information of the transportation service vehicle, and
the status information corresponding to the third transportation service stage comprises an estimated time to arrive at a destination of the transportation trip, and a traffic condition on a route to the destination of the transportation trip; and
upon determining that the screen of the terminal device is locked,
providing the obtained status information matching the current service stage on the locked screen of the terminal device.

7. The system of claim 6, wherein:
the service comprises a vehicle service requested via Internet.

8. The system of claim 6, wherein the target location comprises:
a pick-up location for the transportation service vehicle to pick up the passenger; or
a current location of the passenger.

9. The system of claim 6, wherein providing the obtained status information on the locked screen of the terminal device comprises:
at the first transportation service stage, displaying the target distance between the transportation service vehicle and the target location.

10. A non-transitory computer-readable storage medium including instructions that, when executed by at least one processor of a computing system, cause the computing system to perform operations comprising:
determining a current service stage of a service requested by a terminal device, wherein determining the current service stage comprises:
in response to determining that a passenger has not been picked up by a transportation service vehicle, obtaining a distance between the transportation service vehicle and a target location as a target distance;
determining a first transportation service stage as the current service stage, in response to determining that the target distance exceeds or equals to a preset threshold;
determining a second transportation service stage as the current service stage, in response to determining that the target distance is below the preset threshold; and
determining a third transportation service stage as the current service stage, in response to determining that the passenger has been picked up and a transportation trip of the service has commenced;
based on the current service stage, obtaining status information matching the current service stage for displaying on a locked screen of the terminal device, wherein:
different pieces of status information match with different service stages for displaying, the status information corresponding to the first transportation service stage comprises the target distance between the transportation service vehicle and the target location, the status information corresponding to the second transportation service stage comprises vehicle information of the transportation service vehicle, and the status information corresponding to the third transportation service stage comprises an estimated time to arrive at a destination of the transportation trip, and a traffic condition on a route to the destination of the transportation trip; and upon determining that the screen of the terminal device is locked, providing the status information matching the current service stage on the locked screen of the terminal device.

11. The non-transitory computer-readable storage medium of claim 10, wherein providing the obtained status information on the locked screen of the terminal device comprises:

at the first transportation service stage, displaying the target distance between the transportation service vehicle and the target location.

\* \* \* \* \*